United States Patent [19]
Hoff et al.

[11] 3,891,150
[45] June 24, 1975

[54] DRIP IRRIGATION DEVICE

[75] Inventors: John K. Hoff, Houston; John B. Goss, Tomball, both of Tex.

[73] Assignee: AG International, Houston, Tex.

[22] Filed: Apr. 29, 1974

[21] Appl. No.: 465,101

[52] U.S. Cl. ............................... 239/272; 239/547
[51] Int. Cl. ............................................. A62c 23/06
[58] Field of Search .......... 239/271, 272, 229, 547, 239/542

[56] References Cited
UNITED STATES PATENTS

| | | | |
|---|---|---|---|
| 1,659,470 | 2/1928 | Owen et al. | 239/547 |
| 2,196,456 | 4/1940 | Charroin | 239/547 X |
| 3,587,972 | 6/1971 | Weeth | 239/229 |
| 3,729,142 | 4/1973 | Rangel-Garza et al. | 239/547 |
| 3,806,031 | 4/1974 | Olson | 239/272 |

Primary Examiner—Lloyd L. King
Attorney, Agent, or Firm—Fulbright & Jaworski

[57] ABSTRACT

A drip irrigation device which provides an efficient means of applying fluid to crops, orchards and the like. The device, which will be referred to as an emitter, includes a body cone and a cap which allow the fluid to be dispersed at a selected rate.

7 Claims, 8 Drawing Figures

PATENTED JUN 24 1975  3,891,150

SHEET 1

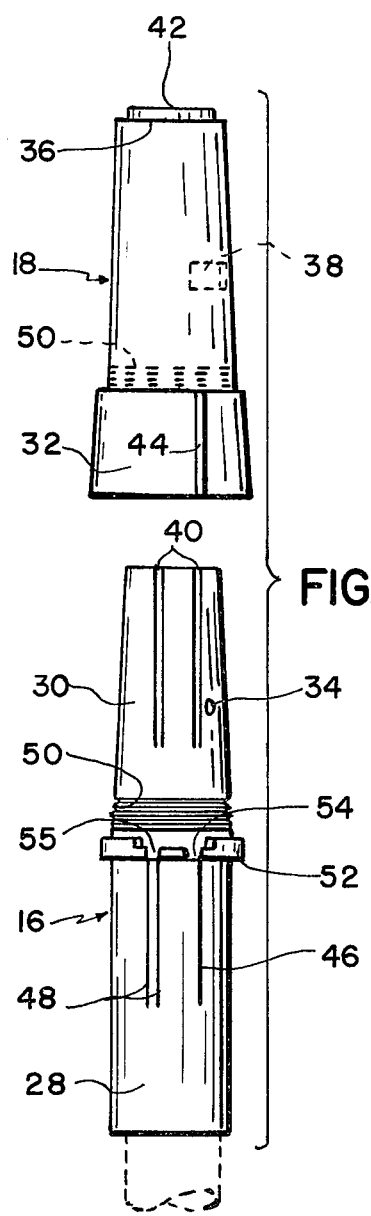
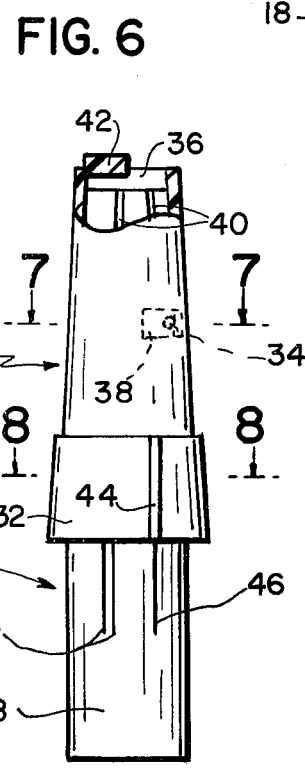
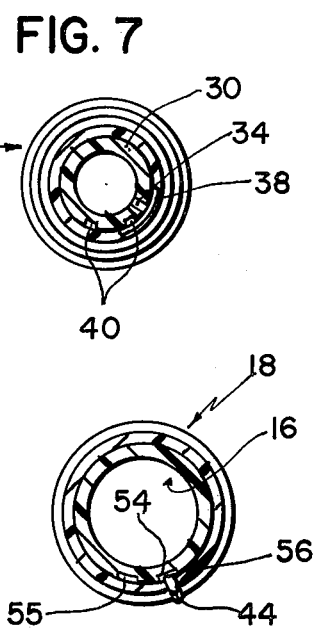

3,891,150

DRIP IRRIGATION DEVICE

BACKGROUND OF THE INVENTION

Drip irrigation on a commercial scale can be traced back to 1969-1970. A review of developments in drip irrigation since that time is presented in Irrigation Age, June, 1973, Vol. 7, No. 11. Of particular interest is the article "Drip Country, USA" on pages 32–35 of that publication.

With drip irrigation, water is applied to the plant's root zone on a regular basis to replace water which is lost by evaporation from the soil and transpiration by the plant. Drip irrigation permits the production of crops in arid areas where water is at a premium or in areas where water contains a high salt content.

Included among the advantages and benefits of drip irrigation systems are a reduction of 50–90 percent in the amount of water used and a reduction in weed growth since the root zone alone receives moisture. Drip irrigation may be used in hilly areas where conventional irrigation methods cannot be used and on soils with physical problems such as slow percolation rates. While the use of a drip irrigation system will result in a reduction of labor needed for irrigation purposes, increased productivity will result from the slow constant rate of application of water which helps to eliminate damage to the plants caused by physiological water stress. Water with a high salt content may be used since a smaller amount of water is applied and the salt does not concentrate as it would in a soil which is alternately dry and wet. When drip irrigation is used, young trees and plants grow more rapidly and produce earlier. Finally, drip irrigation does not interfere with cultural practices and harvesting since the area between rows or plants is not wet.

SUMMARY OF THE PRESENT INVENTION

The drip irrigation device of the present invention, when used with a tap and drip irrigation system, generally provides an efficient means of applying fluid to crops, orchards and the like. The invention, which will be referred to as an emitter, includes a body cone and a cap which allow the fluid to be dispersed at a selected rate.

It is, therefore, an object of the present invention to provide an emitter apparatus for dispensing fluid in an irrigation system including a tubular emitter body cone having an open end, an enclosed end, a hole in the wall of the emitter body cone for allowing the passage of fluid, and one or more grooves on the exterior wall of the emitter body cone. The emitter apparatus also includes a tubular emitter cap having an open end, a recess in its interior wall to allow the passage of fluid, a rectangular strip for selecting the number of grooves which will emit fluid and a baffle plate at the end of the emitter cap for producing a drip effect upon the fluid and to prevent pluggage.

Still other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

In the drawings forming a part of the disclosure herein, like character references designate like parts throughout the several views, wherein:

FIG. 5 is a front elevational view of the emitter body cone and the emitter cap when disjoined, FIG. 6 is a front elevational view, partly in section, of the emitter body cone and emitter cap when the two are joined, FIG. 7 is a sectional view of the emitter body cone and emitter cap taken on the line 7—7 of FIG. 6, and FIG. 8 is a sectional view of the emitter body cone and emitter cap taken on the line 8—8 of FIG. 6.

DESCRIPTION OF THE PREFERRED EMBODIMENT

Figure 1:
FIG. 1 is a perspective of the drip irrigation system including pipe shown in spaced relation with taps and emitters attached.
Figure 2:
FIG. 2 is an end view of the drip irrigation element.

Shown in FIG. 1 is a perspective of the drip irrigation system, including pipe, as it might be used for irrigation purposes. The purpose of the system is to provide an efficient means of applying fluid such as water and fertilizer to crops, orchards and the like. The system includes pipe 10 and a drip irrigation element 12 used in connection with the pipe 10. The drip irrigation element 12, as shown in FIG. 2, includes a tap 14 for attachment to the pipe 10, an emitter body cone 16 attached to the tap 14, and an emitter cap 18 attached to the emitter body cone 16. While a number of plastic metallic or other materials may be used, preferably the pipe 10 is formed of polyethylene.

Figure 3:
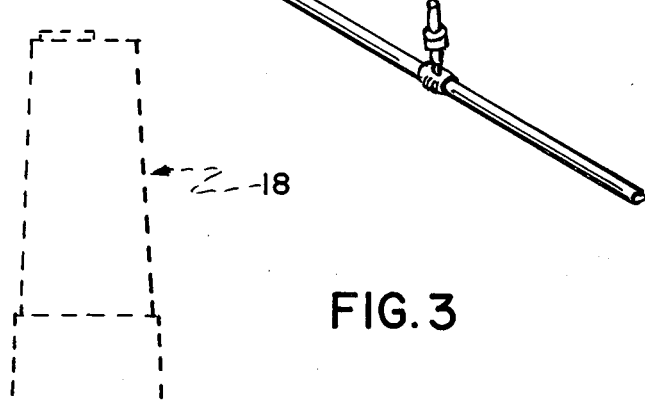
FIG. 3 is a side elevational view of the tap.
Figure 4:
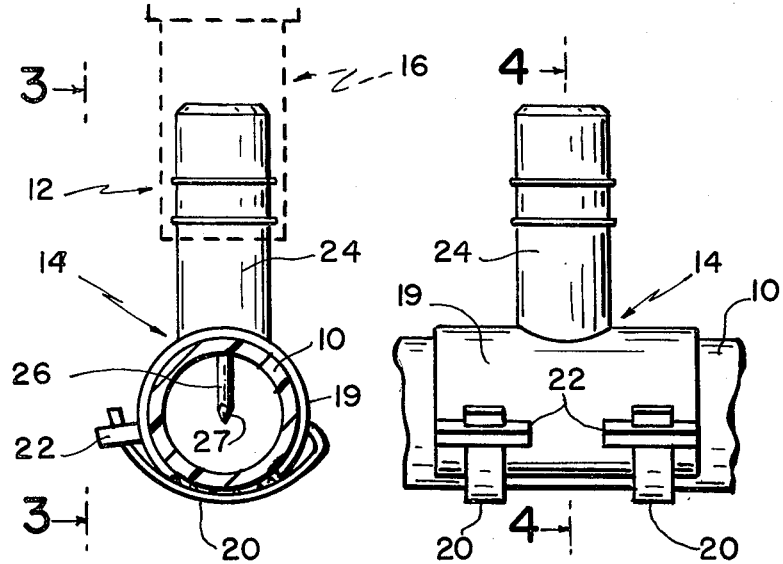
FIG. 4 is a sectional view taken on the line 4—4 of FIG. 3.
Figure 4:
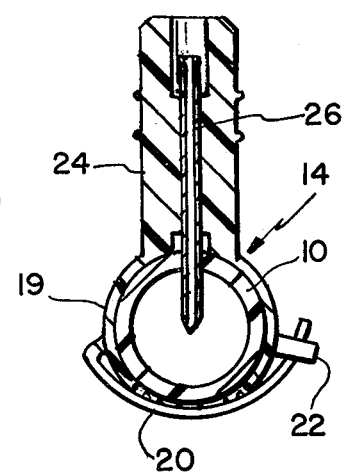

As shown in FIGS. 2, 3 and 4, a sleeve 19 integrally formed of tap 14 partially surrounds the pipe 10. The tap 14 is secured to the pipe 10 by means of a pair of straps 20 which are secured to one side of the sleeve 19 and engage loops 22 on the opposite side of the sleeve 19.

A male stinger 24 is attached to the sleeve of the tap 14. Located within the male stinger 24 of the tap and extending downward through the sleeve 19 is a cannula 26 formed of stainless steel, re-enforced nylon or any other appropriate material to pierce the pipe 10 and serve as a passage for fluid from the pipe 10 to the emitter body cone 16. The cannula 26 is provided with a tip 27 forming a pointed end to facilitate penetration of the pipe 10. The use of the cannula 26 to remove fluid from the pipe 10 offers minimal restriction in the pipe 10 which results in minimal restriction of flow in the pipe 10 when removing fluid therefrom. The cannula 26 is inserted into the pipe 10 without prior drilling or punching of the pipe 10. The cannula 26 does not produce a plug which falls into the pipe 10 and is carried downstream, nor does it produce a core which will plug the cannula 26. In addition to being easy to install, the tap 14 engages the pipe 10 for liquid communication therewith without any resulting leakage.

The emitter body cone 16, as shown in FIGS. 5-8, is of one-piece construction and consists of a lower half 28 which serves as a female receptacle for the male stinger 24 of the tap 14 and an upper half 30 which also serves as a male stinger. The male stinger 30 of the emitter body cone 16 sealingly engages the female receptacle 32 of the emitter cap 18 so that fluid may pass only through a hole and grooves in the emitter body cone 16 and a recess in the emitter cap 18 as is explained hereafter.

Fluid from the pipe 10 reaches the interior of the emitter body cone 16 by means of the cannula 26 which is located within the male stinger 24 of the tap 14. The end of the male stinger 30 of the emitter body cone 16 is sealed. However, fluid is allowed access from the interior of the emitter body cone 16 to the interior of the emitter cap 18 by means of a hole 34 which extends through the side of the male stinger 30 of the emitter body cone 16 as shown in FIGS. 5, 6 and 7.

The male stinger 30 of the emitter body cone 16 fits flush within the female receptacle 32 of the emitter cap 18. Therefore, in order to allow the fluid to pass through the open end 36 of the emitter cap 18, a portion of the inner wall of the emitter cap is recessed. As shown in FIGS. 5, 6 and 7, the resulting recess 38 in the emitter cap 18 extends from the hole 34 in the emitter body cone 16 to one or more grooves 40 formed on the outer wall of the emitter body cone 16. Therefore, the recess 38 provides liquid communication between the hole 34 and the grooves 40. The grooves 40 extend from a point alongside the hole 34 in the emitter body cone 16 to the end of the male stinger 30 of the emitter body cone 16.

In order to break the flow of the fluid before it leaves the emitter cap 18, a baffle plate 42 is placed over a portion of the open end 36 of the emitter cap 18. In addition to providing a drip effect by reducing the pressure of the fluid as it leaves the emitter cap 18, the baffle plate 42 also helps to prevent pluggage of the emitter.

As shown in FIG. 5, the preferred embodiment includes two grooves 40 on the outer wall of the emitter body cone 16. The size of each groove 40 is such that 1 gallon of fluid may pass through it per hour at a pressure in the pipe 10 of 8 to 14 pounds per square inch. The size of the hole 34 which extends through the side of the emitter body cone 16 is not important as long as it is at least large enough to supply 2 gallons of fluid per hour.

The two grooves 40 in the emitter body cone 16 are positioned with respect to the recess 38 in the interior wall of the emitter cap 18 so that one or both of the grooves 40 may selectably receive fluid from the hole 34 in the emitter body cone 16. The use of one or two grooves 40 is determined by location of the emitter cap 18 upon the emitter body cone 16. As shown in FIGS. 5, 6 and 8, a reference line 44 is placed upon the exterior of the emitter cap 18 which may be rotated so that the reference line 44 aligns with the one-gallon line 46 or the 2 gallon line 48 of the emitter body cone 16 as desired. In FIG. 6, the reference line 44 is shown aligned with the one-gallon line 46.

The preferred embodiment of the emitter body cone 16 includes an exterior cylindrical ring 52 around the middle of the emitter body cone 16. The cylindrical ring 52 contains two key ways 54 and 55 which allow one to select the use of one or both of the grooves 40. Located within the female receptacle 32 end of the emitter cap 18 is a rectangular key 56 which will engage either of the two key ways 54 and 55. If the rectangular key 56 engages key way 54 which allows the use of only one groove, the recess 38 in the emitter cap 18 will extend over only the first of the two grooves 40. If the key 56 engages the other key way 55, the recess 38 in the emitter cap 18 will extend over both grooves 40 and, therefore, fluid will be allowed to flow from both grooves 40. In each case, recess 38 communicates with hole 34 in emitter body cone 16. While the preferred embodiment includes the above-mentioned cylindrical ring 52, the same result may be obtained by the use of indentions into the exterior wall of the emitter body cone 16.

If fluid should fail to drip from the emitter cap 18, the cap may be removed to expose the fluid passages which can be cleaned easily on location.

Preferably, 60° annular matching grooves 50 are formed on the interior wall of the emitter cap 18 and the exterior wall of the emitter body cone 16. The use of such grooves 50, which function as a seal, helps to prevent leakage and to secure the emitter cap 18.

In operation, the cannula 26 of the tap 14 is forced through the wall of the plastic pipe 10, and the straps 20 are pulled through the loops 22 to secure the tap about the pipe. The emitter body cone 16 is press-fit onto the stinger 24 of the tap and the emitter cap 18 is press-fit onto the emitter body cone 16 by engagement of the grooves 50 of the two latter members and matching external taper of the male stinger 30 of the emitter body cone 16 with the internal taper of the female receptacle 32 of the emitter cap 18. The reference line 44 of the emitter cap 18 is aligned with either the 1-gallon line 46 or the 2-gallon line 48 of the emitter body cone 16 depending on the desired flow rate. Consequently, upon admission of fluid under pressure to the pipe 10, the fluid passes through the cannula 26 of the tap, into the interior of the emitter body cone 16, through the hole 34 and into the recess 38 on the interior wall of the emitter cap 18, through the groove or grooves 40, and thence out the open end 36 of the emitter cap 18.

The drip irrigation device of the present invention may be used in connection with the tap and drip irrigation system to provide an efficient means of applying fluid to crops, orchards and the like. The pipe, tap and emitter device may be placed above or below the ground, and use of these elements provides maximum benefits of irrigation with minimal amounts of fluid.

The primary purpose and advantage of the invention is the provision of a drip effect by which the pressure of the fluid is reduced as it leaves the emitter cap rather than the pipe. The baffle plate 42, which produces the drip effect, also helps to prevent pluggage of the emitter. Other advantages of the present device include the use of a cannula to produce a minimal restriction of flow in the pipe, the ability to select more than one rate of flow for each emitter, and the use of matching annular grooves on the emitter body cone and emitter cap to secure the emitter cap and to prevent leakage.

The present invention, therefore, is well adapted to carry out the objects and attain the ends and advantages mentioned as well as others therein. While a presently-preferred embodiment of the invention has been given for the purpose of disclosure, numerous changes in the detail of construction and the combination, shape, size and arrangement of parts may be resorted to without departing from the spirit and the scope of the invention as hereinafter claimed.

What is claimed is:

1. An emitter apparatus for dispensing fluid from an irrigation system at a selected rate, including, a. a tubular emitter body cone having 1. a hole in the wall of the emitter body cone allowing fluid to pass outwardly therethrough from the interior portion of the emitter body cone and
2. At least one longitudinal groove on the exterior wall of the emitter body cone extending substantially the length of the emitter body cone and to the enclosed end of the emitter body cone, and b. a tubular emitter cap releasably secured to the emitter body cone for receiving the fluid from said emitter body cone, and, in conjunction with the groove of the emitter body cone, provides a volume restricting passageway.

2. An emitter apparatus for dispensing fluid in an irrigation system at a selected rate, including, a. a tubular emitter body cone having
1. an open end,
2. an enclosed end forming a male stinger,
3. a hole in the wall of the emitter body cone allowing fluid to pass outwardly therethrough from the interior portion of the emitter body cone,
4. one or more grooves on the exterior wall of the emitter body cone extending to the enclosed end (a) (2) of the emitter body cone, and
5. key means on the exterior wall of the emitter body cone for selecting the appropriate grooves (a) (4), and b. a tubular emitter cap, which receives the fluid from the emitter body cone, having
1. an open end serving as a female receptacle for the male stinger (a) (2) of the emitter body cone,
2. a recess in the interior wall of the emitter cap for fluid communication from the hole (a) (3) in the emitter body cone to at least one of the grooves (a) (4) of the emitter body cone,
3. means on the interior wall of the emitter cap co-acting with the means (a) (5) for selecting the number of grooves (a) (4) which will be used to emit fluid from the emitter apparatus, and
4. a baffle plate at the end of the emitter cap.

3. The invention of claim 2 wherein grooves (a) (4) of the emitter body cone, more specifically, include two grooves on the exterior wall of the emitter body cone extending to the enclosed end (a) (2) of the emitter body cone.

4. The invention of claim 2 wherein annular matching grooves are placed upon the interior wall of the emitter cap (b) and the exterior wall of the emitter body cone (a) to releasably secure the emitter cap (b) to the emitter body cone (a) and to prevent leakage therebetween.

5. The invention of claim 2 including a reference line upon the exterior of the emitter cap (b) for aid in selecting the number of gallons of fluid per hour to be dispensed from the emitter cap.

6. An emitter apparatus for dispensing fluid from an irrigation system at a selected rate, including, a. a tubular emitter body cone having
1. an open end,
2. an enclosed end forming a male stinger,
3. a hole in the wall of the emitter body cone allowing fluid to pass outwardly therethrough from the interior portion of the emitter body cone,
4. two grooves on the exterior wall of the emitter body cone extending to the enclosed end (a) (2) of the emitter body cone,
5. key means on the exterior wall of the emitter body cone for selecting appropriate grooves (a) (4), and
6. annular grooves upon the exterior wall of the emitter body cone, and b. a tubular emitter cap, which receives the fluid from the emitter body cone, having
1. an open end serving as a female receptacle for the male stinger (a) (2) of the emitter body cone,
2. a recess in the interior wall of the emitter cap for fluid communication from the hole (a) (3) in the emitter body cone to at least one of the grooves (a) (4) of the emitter body cone,
3. means on the interior wall of the emitter cap co-acting with the means (a) (5) for selecting the number of grooves (a) (4) which will be used to emit fluid from the emitter apparatus,
4. a baffle plate at the end of the emitter cap,
5. annular grooves on the interior wall of the emitter cap (b) for mating with the annular grooves (a) (6) on the exterior wall of the emitter body cone (a) to releasably secure the emitter cap (b) to the emitter body cone (a) and to prevent leakage therebetween, and
6. a reference line upon the exterior of the emitter cap for aid in selecting the rate of fluid dispensed from the emitter cap.

7. The invention of claim 6 wherein the fluid is dispensed at the rate of one or two gallons per hour.

* * * * *